US008651954B2

(12) United States Patent
Okada

(10) Patent No.: US 8,651,954 B2
(45) Date of Patent: Feb. 18, 2014

(54) GAMING TERMINAL, GAMING SYSTEM AND GAME CONTROL METHOD

(75) Inventor: Kazuo Okada, Tokyo (JP)

(73) Assignee: Aruze Gaming America, Inc., Las Vegas, NV (US)

(*) Notice: Subject to any disclaimer, the term of this patent is extended or adjusted under 35 U.S.C. 154(b) by 1395 days.

(21) Appl. No.: 11/723,255

(22) Filed: Mar. 19, 2007

(65) Prior Publication Data

US 2008/0076551 A1 Mar. 27, 2008

Related U.S. Application Data

(60) Provisional application No. 60/846,341, filed on Sep. 22, 2006.

(51) Int. Cl.
*A63F 13/12* (2006.01)

(52) U.S. Cl.
USPC .................... 463/42; 463/25; 463/29; 463/43

(58) Field of Classification Search
USPC ........................ 463/25, 29, 31, 36, 43, 40–42
See application file for complete search history.

(56) References Cited

U.S. PATENT DOCUMENTS

| | | | | |
|---|---|---|---|---|
| 6,645,077 B2 | 11/2003 | Rowe | | |
| 2002/0137217 A1* | 9/2002 | Rowe | .............................. | 436/42 |
| 2003/0176218 A1* | 9/2003 | LeMay et al. | .................. | 463/25 |
| 2005/0054448 A1 | 3/2005 | Frerking et al. | | |
| 2005/0124407 A1* | 6/2005 | Rowe | .............................. | 463/25 |
| 2006/0035713 A1 | 2/2006 | Cockerille et al. | | |
| 2007/0054738 A1* | 3/2007 | Muir | .............................. | 463/42 |

* cited by examiner

*Primary Examiner* — Damon Pierce
(74) *Attorney, Agent, or Firm* — Lexyoume IP Meister, PLLC.

(57) ABSTRACT

A gaming terminal according to the present invention comprises: a first memory capable of storing game history data for a player; a network interface for communicating with a server which stores a plurality of types of game software; a second memory which stores game software downloaded from the server through the network interface; and a controller, the controller storing, in the first memory, the game history data acquired according to an input from outside, downloading game software corresponding to the game history data stored in the first memory from the server through the network interface, when the game software corresponding to the game history data stored in the first memory is different from the game software stored in the second memory, storing the downloaded game software in the second memory, and executing a game based on the game software stored in the second memory.

16 Claims, 10 Drawing Sheets

GAMING TERMINAL, GAMING SYSTEM AND GAME CONTROL METHOD

CROSS-REFERENCE TO RELATED APPLICATIONS

This application claims priority of U.S. Provisional Application No. 60/846,341 filed on Sep. 22, 2006. The contents of this application are incorporated herein by reference in their entirety.

BACKGROUND OF THE INVENTION

1. Field of the Invention

The present invention relates to a gaming terminal, a gaming system and a game control method.

2. Discussion of the Background

The specification of U.S. Pat. No. 6,645,077, and the specifications of US 2005/0054448-A1 and US 2006/0035713-A1 disclose gaming systems capable of executing a plurality of types of games in a single gaming terminal or changing the contents of games which can be played in gaming terminals in a network, utilizing techniques for downloading game programs through a network.

In the aforementioned gaming systems, game software components are downloaded to the respective gaming terminals from a server, and the respective gaming terminals execute games using the downloaded game software components.

It is an object of the present invention to provide game environments which are preferred by players, thus offering novel entertainment.

The contents of U.S. Pat. No. 6,645,077, US 2005/0054448-A1, and US 2006/0035713-A1 are incorporated herein by reference in their entirety.

SUMMARY OF THE INVENTION

A gaming terminal according to the first aspect of the present invention provides a gaming terminal having the following configuration.

That is, a gaming terminal according to the first aspect of the present invention comprises: a first memory capable of storing game history data for a player; a network interface for communicating with a server which stores a plurality of types of game software; a second memory which stores game software downloaded from the server through the network interface; and a controller. The controller stores, in the first memory, the game history data acquired according to an input from outside, downloads game software corresponding to the game history data stored in the first memory from the server through the network interface, when the game software corresponding to the game history data stored in the first memory is different from the game software stored in the second memory, stores the downloaded game software in the second memory, and executes a game based on the game software stored in the second memory.

A gaming terminal according to the second aspect of the present invention provides a gaming terminal having the following configuration.

That is, a gaming terminal according to the second aspect of the present invention comprises: a card slot which enables a card storing game history data for a player to be inserted therein; a first memory which stores the game history data read from the card inserted in the card slot; a network interface for communicating with a server which stores a plurality of types of game software; a second memory which stores game software downloaded from the server through the network interface; a selection switch for selecting changing or not changing game software; a display capable of displaying an image; and a controller. The controller reads the game history data from the card inserted in the card slot and stores the game history data in the first memory, displays, to the display, an image which enables selecting changing or not changing the game software stored in the second memory to game software corresponding to the game history data stored in the first memory, when the game software corresponding to the game history data stored in the first memory is different from the game software stored in the second memory, downloads the game software corresponding to the game history data stored in the first memory from the server through the network interface, when changing the game software stored in the second memory to the game software corresponding to the game history data stored in the first memory is selected by inputting to the selection switch, stores the downloaded game software in the second memory, and executes a game based on the game software stored in the second memory.

A gaming terminal according to the third aspect of the present invention provides a gaming terminal having the following configuration.

That is, a gaming terminal according to the third aspect of the present invention comprises: a cabinet; a front-side display provided in the front surface of the cabinet; an upper display provided above the front-side display; a foot display provided below the front-side display; lamps which emit light with a predetermined pattern; a first memory capable of storing game history data for a player; a network interface for communicating with a server which stores a plurality of types of game software; a second memory which stores game software downloaded from the server through the network interface; and a controller. The controller stores, in the first memory, the game history data acquired according to an input from outside, downloads game software corresponding to the game history data stored in the first memory from the server through the network interface, when the game software corresponding to the game history data stored in the first memory is different from the game software stored in the second memory, stores the downloaded game software in the second memory, and controls the displays to the front-side display, the upper display and the foot display and also controls the light-emission pattern of the lamps, based on the game software stored in the second memory.

A gaming system according to the fourth aspect of the present invention provides a gaming system having the following configuration.

That is, a gaming system according to the fourth aspect of the present invention comprises a gaming terminal and a server. The aforementioned gaming terminal comprises: a first memory capable of storing game history data for a player; a network interface for communication; a second memory which stores game software received through the aforementioned network interface; and a controller. The controller stores, in the aforementioned first memory, the aforementioned game history data acquired according to inputs from outside, transmits a request signal which requests transmission of game software corresponding to the game history data stored in the aforementioned first memory, when the game software corresponding to the game history data stored in the aforementioned first memory is different from the game software stored in the aforementioned second memory, stores, in the aforementioned second memory, the game software transmitted in response to the aforementioned request signal and executes games based on the game software stored in the aforementioned second memory. The aforementioned server comprises: a third memory which stores a plurality of types of game software; and a processor which, on receiving the aforementioned request signal from the aforementioned gaming terminal, selects game software corresponding to the received request signal from the aforementioned third memory and transmits the game software to the aforementioned gaming terminal.

A game control method for a gaming terminal according to the fifth aspect of the present invention provides a game control method for a gaming terminal having the following configuration.

That is, a game control method for a gaming terminal according to the fifth aspect of the present invention comprises the steps of: storing, in a first memory, game history data for a player acquired according to inputs from outside; downloading game software corresponding to the game history data stored in the aforementioned first memory from a server, when the game software corresponding to the game history data stored in the aforementioned first memory is different from game software which has been downloaded from the aforementioned server and stored in a second memory, wherein the aforementioned server stores a plurality of types of game software; storing the downloaded game software in the aforementioned second memory; and executing games based on the game software stored in the aforementioned second memory.

A game control method for a gaming terminal according to the sixth aspect of the present invention provides a game control method for a gaming terminal having the following configuration.

That is, a game control method for a gaming terminal according to the sixth aspect of the present invention comprises the steps of: reading game history data for a player from a card inserted in a card slot and storing the game history data in a first memory; displaying, to a display, an image which enables selecting changing or not changing game software stored in a second memory to game software corresponding to the game history data stored in the aforementioned first memory, when the game software corresponding to the game history data stored in the aforementioned first memory is different from the game software which has been downloaded from a server storing a plurality of types of game software and stored in the aforementioned second memory; downloading the game software corresponding to the game history data stored in the aforementioned first memory from the aforementioned server, if changing the game software stored in the aforementioned second memory to the game software corresponding to the game history data stored in the aforementioned first memory is selected; storing the downloaded game software in the aforementioned second memory; and executing games based on the game software stored in the aforementioned second memory.

A game control method for a gaming terminal according to the seventh aspect of the present invention provides a game control method for a gaming terminal having the following configuration.

That is, a game control method for a gaming terminal according to the seventh aspect of the present invention comprises the steps of: storing, in a first memory, game history data for a player acquired according to inputs from outside; downloading game software corresponding to the game history data stored in the aforementioned first memory from a server, when the game software corresponding to the game history data stored in the aforementioned first memory is different from game software which has been downloaded from the aforementioned server and stored in a second memory, wherein the aforementioned server stores a plurality of types of game software; storing the downloaded game software in the aforementioned second memory; and controlling the displays to a front-side display provided in the front surface of a cabinet, an upper display provided above the aforementioned front-side display and a foot display provided below the aforementioned front-side display and also controlling the light-emission pattern of lamps provided in the aforementioned cabinet, based on the game software stored in the aforementioned second memory.

A game control method according to the eighth aspect of the present invention provides a game control method having the following configuration.

That is, a game control method according to the eighth aspect of the present invention comprises the steps of: storing, in a first memory, game history data for a player acquired according to an input from outside; when the game software corresponding to the game history data stored in the aforementioned first memory is different from game software stored in a second memory included in a gaming terminal, downloading the game software corresponding to the game history data stored in the aforementioned first memory to the aforementioned gaming terminal and storing in the aforementioned second memory; and executing a game based on the game software stored in the aforementioned second memory.

There is no particular limitation on the aforementioned gaming terminals, and it is possible to employ, for example, gaming machines such as slot machines, personal computers, personal digital assistants, and the like. Further, there is no particular limitation on games which are executed in the aforementioned gaming terminals, and such games may be, for example, video bingo games, video lottery games, video blackjack games, video slot games, mechanical slot games, video poker games, video Kino games, video pachinko games, video card games, Video-game-of-chances, and the like.

There is no particular limitation on the hardware structure of the aforementioned server, provided that it can function as the server according to the present invention, and a conventional server can be employed. Further, the aforementioned server can include a firewall and a modem. The aforementioned server can be constituted by either a single device or a plurality of devices. Anyone of the aforementioned gaming terminals which includes a firewall and a modem can be configured to function as the aforementioned server.

There is no particular limitation on the aforementioned network interface, and the aforementioned first network interface can be either a wireless network interface or a wired network interface, provided that it can communicate with a server. Further, the communication between the aforementioned server and the aforementioned plurality of gaming terminals can be realized through the internet or an intranet. There is no particular limitation on the aforementioned intranet, and the aforementioned intranet can be, for example, a cashless system network, a progressive game network, an accounting network, a bonus game network and the like. There is no particular limitation on the aforementioned first memory, and the aforementioned first memory can be, for example, a nonvolatile memory, a hard disk drive, a CD-RW drive, a DVD-RAM drive and the like. This applies to the aforementioned second memory.

The aforementioned game software is constituted by a combination of game software components. The aforementioned game software components are data, programs, modules and the like which are used in executing games in the gaming terminals. The aforementioned game software components may be, for example, game system components, payout tables, game bouncing programs, game progressive programs, graphic data, image display control data, sound data, light-emission pattern data, game jurisdiction information, game network components and the like. The aforementioned controller can execute games using game software (combinations of game software components).

The aforementioned card may store an ID code. Further, the aforementioned card may store only an ID code, while game history data corresponding to the ID code can be stored in the server. Also, the aforementioned controller can acquire game history data according to inputs of biologic information such as fingerprints and veins. The game history data can be stored either in the aforementioned card, in a third memory included in the aforementioned server or in both of them.

Further, the aforementioned controller can execute games using only game software components downloaded from the server. Also, the aforementioned controller can execute games using combinations of game software components downloaded from the server and game software components which have been pre-stored in the second memory.

In the aforementioned gaming system, each gaming terminal can create game process data which will be described later and then can transmit it to the aforementioned server, and the server can store it in the aforementioned first memory. The game process data may be, for example, game version data, game data, gaming terminal data, player data, route data, venue data, and the like. The player data may include, for example, the number of consumed game media and the number of games, and points offered in games. The game process data can be stored in the aforementioned third memory as a database, in such a way that the game process data is separated from the aforementioned game software components.

The aforementioned processor can be configured to conduct the following processes 1) to 4) for downloading the aforementioned game software components.

1) Processing for establishing communication with gaming terminals,
2) Processing for selecting game software components to be updated,
3) Processing for bundling the selected game software components, and
4) Processing for downloading the bundled game software components to the aforementioned gaming terminals.

Further, the aforementioned processor can conduct the following processes 1) to 11) for downloading the aforementioned game software components.

1) Processing for making contact with a local ISP (an internet service provider) prior to the start of transmission of the aforementioned game software components and transmitting the aforementioned game software components through the aforementioned local ISP,
2) Processing for checking the IP addresses of gaming terminals,
3) Processing for dividing the aforementioned game software components into a plurality of packets,
4) Processing for coding the aforementioned game software components,
5) Processing for creating instructions relating to the setting of the aforementioned game software components and transmitting the aforementioned instructions along with the aforementioned game software components,
6) Processing for making a request of the aforementioned gaming terminals for version information about the aforementioned game software components,
7) Processing for receiving the version information about the aforementioned game software components from the aforementioned gaming terminals, 8) Processing for receiving game process information from the aforementioned gaming terminals and storing the aforementioned game process information, according to game data categories (for example, game version data, game data, gaming terminal data, player data, route data, venue data and the like),
9) Processing for determining the access authority for the aforementioned game process information, prior to storing the game process information,
10) Processing for selecting data storage partitions from a plurality of data storage partitions corresponding to respective entities, and
11) Processing for checking updating triggers (for example, a time, day and week of updating, updating events, predetermined inputs by the player, results of games, game histories).

The aforementioned controller can conduct the following processes 1) to 5) for structuring game software.

1) Processing for establishing communication with the aforementioned server,
2) Processing for receiving game software components from the aforementioned server,
3) Processing for unbundling the aforementioned game software components,
4) Processing for creating a combination of game software components including the aforementioned game software components received from the aforementioned server, and
5) Processing for executing games using the aforementioned combination of game software components.

Further, the aforementioned gaming system can employ any of the following configurations a) to c).

a) The aforementioned server executes games, and the aforementioned gaming terminals display the results of the games.
b) The aforementioned gaming terminals execute games, the aforementioned server determines the result of games, and the aforementioned gaming terminals display the result of games.
c) The aforementioned gaming terminals execute games and display the result of games, and the aforementioned server downloads the aforementioned game software components to the aforementioned gaming terminals.

In the present invention, with any of the aforementioned configurations a) to c), it is possible to download game software components to be used in the aforementioned gaming terminals from the aforementioned server to the aforementioned gaming terminals. Further, it is possible to download authentication programs when downloading the aforementioned game software components.

BRIEF DESCRIPTIONS OF THE DRAWINGS

DESCRIPTION OF THE EMBODIMENTS

Figure 1:
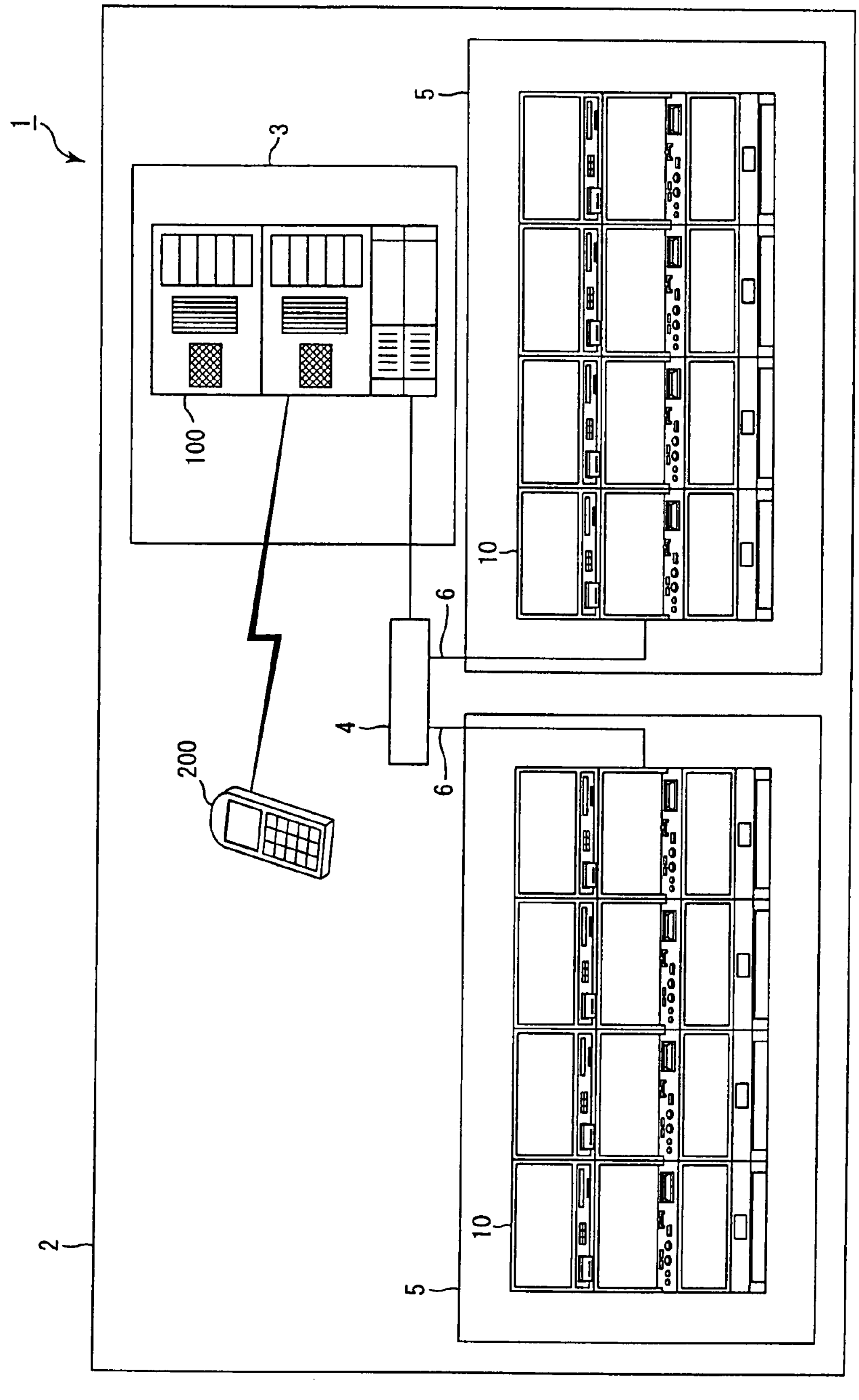
FIG. 1 is a network schematic diagram of a gaming system according to an embodiment of the present invention.

FIG. 1 is a network schematic diagram of a gaming system according to an embodiment of the present invention.

The gaming system 1 includes a server 100 and a plurality of slot machines (gaming terminals) 10 which are installed in a casino 2. The server 100 is installed in a computer room 3 in the casino 2. Further, the plurality of slot machines 10 are installed in a casino floor 5. The server 100 and the plurality of slot machines 10 are connected to each other through a router 4 and a LAN 6. A portable terminal (remote terminal) 200 is carried by a clerk in the casino 2 and is capable of wireless communication with the server 100. Accordingly, even when the clerk enters the computer room 3 or the casino floor 5, he or she can communicate with the server 100 using the portable terminal 200.

The server 100 includes management tools and downloading tools required for managing information about a certain slot machine 10 or a certain group of slot machines 10 and for managing data access of respective users. An operator of the server 100 who has valid access authority can set various types of parameters, as triggers for downloading programs and information such as game software components to the slot machines 10. Further, the server 100 can be either connected to a legacy system such as a cashless system and the like in the casino 2 or directly connected to the slot machines 10. Also, it is possible to utilize both of these structures to easily perform downloading of information and collection of data.

The slot machines 10 correspond to the gaming terminals according to the present invention. However, in the present invention, the gaming terminals are not limited to the case, but may be video slot machines, mechanical slot machines, gaming terminals capable of executing bingo games, Kino games, lottery games and the like.

The slot machines 10 are installed in the casino floor 5. However, in the present invention, there is no particular limitation on the venue in which the gaming terminals are installed, and the venue may be, for example, a casino, a store, a restaurant, a bar, a ship and the like. Also, the venue can be owned and/or managed by a plurality of entities. Also, the gaming system according to the present invention can be structured to include a plurality of different types of venues.

Each slot machine 10 transmits, to the server 100, game process information (for example, the number of inserted coins, the number of coins to be paid out), game-software-component information (for example, version information about software) and player tracking information (for example, the ID code of a player). Further, each slot machine 10 is capable of transmitting and receiving information to and from the server 100 and communicates with the server 100 through the router 4. The slot machines 10 can communicate with the server 100 through a legacy system.

Figure 2:
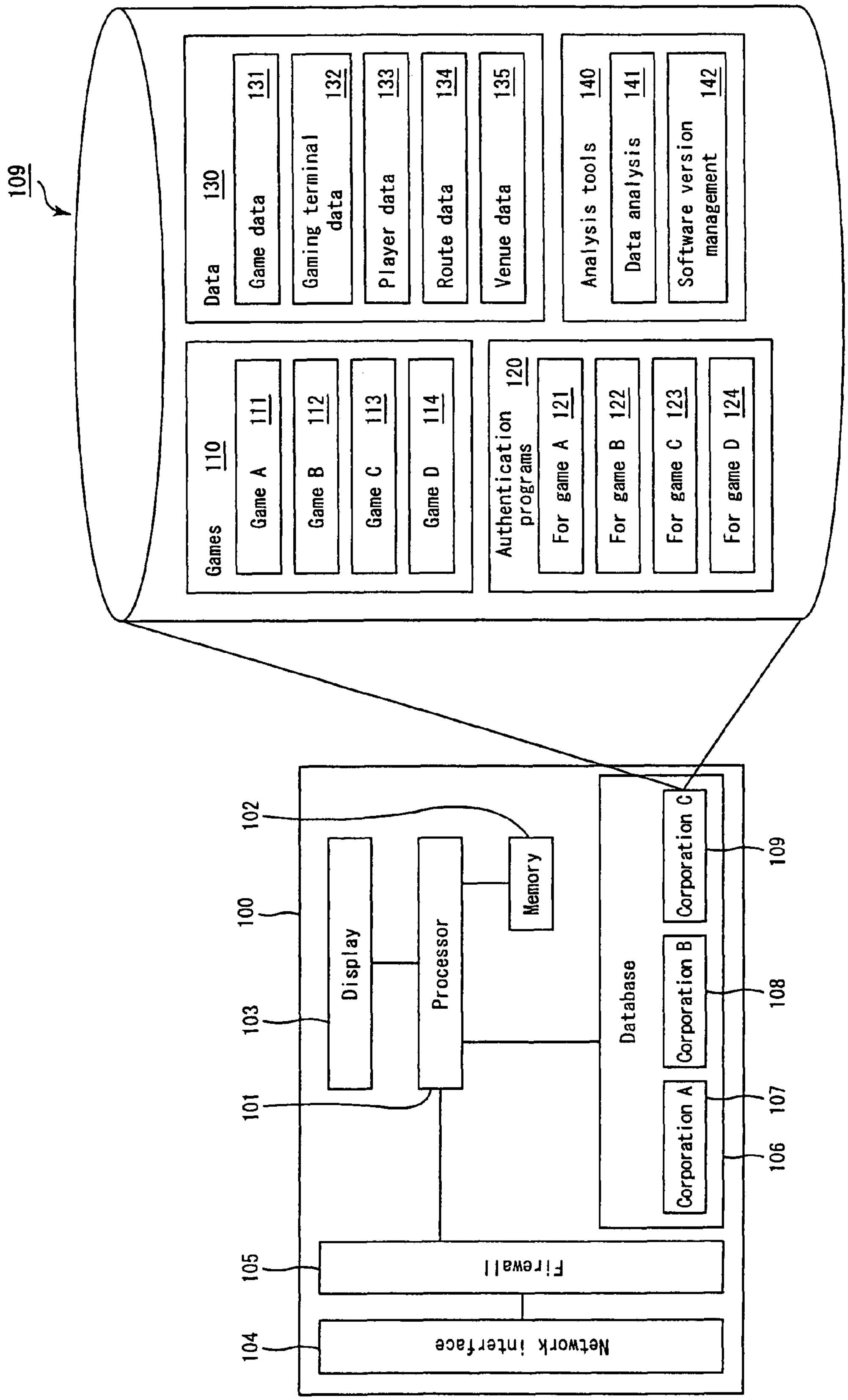
FIG. 2 is a block diagram illustrating the internal structure of a server according to an embodiment of the present invention.

FIG. 2 is a block diagram illustrating the internal structure of a server according to an embodiment of the present invention.

The server 100 includes a processor 101. A memory 102, a database 106 and a display 103 are connected to the processor 101. A network interface 104 is connected to the processor 101 through a firewall 105. The server 100 can communicate with the slot machines (gaming terminals) 10 and the remote terminal 200 through the network interface 104.

The processor 101 corresponds to the processor according to the present invention. The database 106 corresponds to the third memory according to the present invention.

The network interface 104 may be either a wired network interface or a wireless network interface or may include both of them. The server 100 includes a firewall 105 and intercepts, with the firewall 105, unauthorized accesses to the data within the server 100.

The database 106 is a hard disk drive. The database 106 stores, for example, game information such as game process information, game software components, game-software-component information and the like. In the present embodiment, the data in the database 106 is divided for respective entities, as exemplified as "Corporation A" 107, "Corporation B" 108 and "Corporation C" 109.

In the present invention, the number of divisions is not particularly limited, but may be changed as required. Further, the database 106 may be, for example, a well-known recording medium such as a hard disk drive, a CD-RW drive and the like or may be a combination of them.

The data for the respective entities in the database 106 will be described by exemplifying the data of "Corporation C" 109. As illustrated in FIG. 2, the data of "Corporation C" 109 includes games 110, authentication programs 120, data 130 and analysis tools 140.

The games 110 include game software of a game A 111, a game B 112, a game C 113 and a game D 114. Each of the game software is comprised of game system components, a payout table, a game bonusing program, a game progressive program, graphic data, image display control data, sound data, light-emission pattern data, game jurisdiction information, game network components and the like.

The game system components in the game software to be used in the slot machines 10 include, for example, a symbol selection program. The aforementioned symbol selection program is a program for determining symbols to be rearranged in a symbol matrix (see FIG. 3). The aforementioned symbol selection program includes symbol weighting data associated with respective a plurality of types of payout ratios (for example, 80%, 84%, 88%). The symbol weighting data is data which designates the correspondence between respective symbols and one or more random numbers which fall within a predetermined numerical range (0 to 255). The payout ratios are defined on the basis of game jurisdiction information, and symbols to be rearranged in the symbol matrix are determined on the basis of the symbol weighting data associated with the payout ratios.

In the present invention, game software components refer to components which constitute game software. The game software can be structured such that its game software components can be replaced with components of other game software or may be structured such that its game software components can not be replaced.

The authentication programs 120 include a program 121 for the game A, a program 122 for the game B, a program 123 for the game C and a program 124 for the game D. The authentication program is created for the respective game software components. The authentication program includes hash values created from valid game software components and a program for creating hash values from game software components to be authorized using a hash function. The hash function is not particularly limited, but may be, for example, SHA (SHA-1, SHA-256, SHA-384, SHA-512), MD5 and the like. Further, while, in the present embodiment, there will be described a case of employing an authentication program for determining whether or not there is a falsification using a hash function, the authentication program is not particularly limited, but may be a well-known authentication program, in the present invention.

The data 130 includes game data 131, gaming terminal data 132, player data 133, route data 134 and venue data 135.

The game data 131 includes, for example, the number of inserted coins, the number of coins to be paid out, the number of BETs per single game and the like. The gaming terminal data 132 includes, for example, data of game histories of the respective slot machines 10. This data is stored in association with the ID codes of the respective slot machines 10. The player data 133 includes data of game histories of respective players (game history data). This data is stored in association with the ID codes of the respective players. The route data 134 includes, for example, information about gaming terminals which belong to groups of gaming-terminals existing in a route constituted by a plurality of venues. The venue data 135 includes, for example, information about gaming terminals which belong to the respective venues.

The analysis tools 140 include applications for data analysis 141 for defining categories in the data 130 and the relationship among the categories, and software version management 142 for managing the versions of game software components in the respective gaming terminals and the versions of game software components to be downloaded thereto. The processor 101 can execute these applications to conduct management and analysis of the data 109 of the entity "Corporation C".

Figure 3:
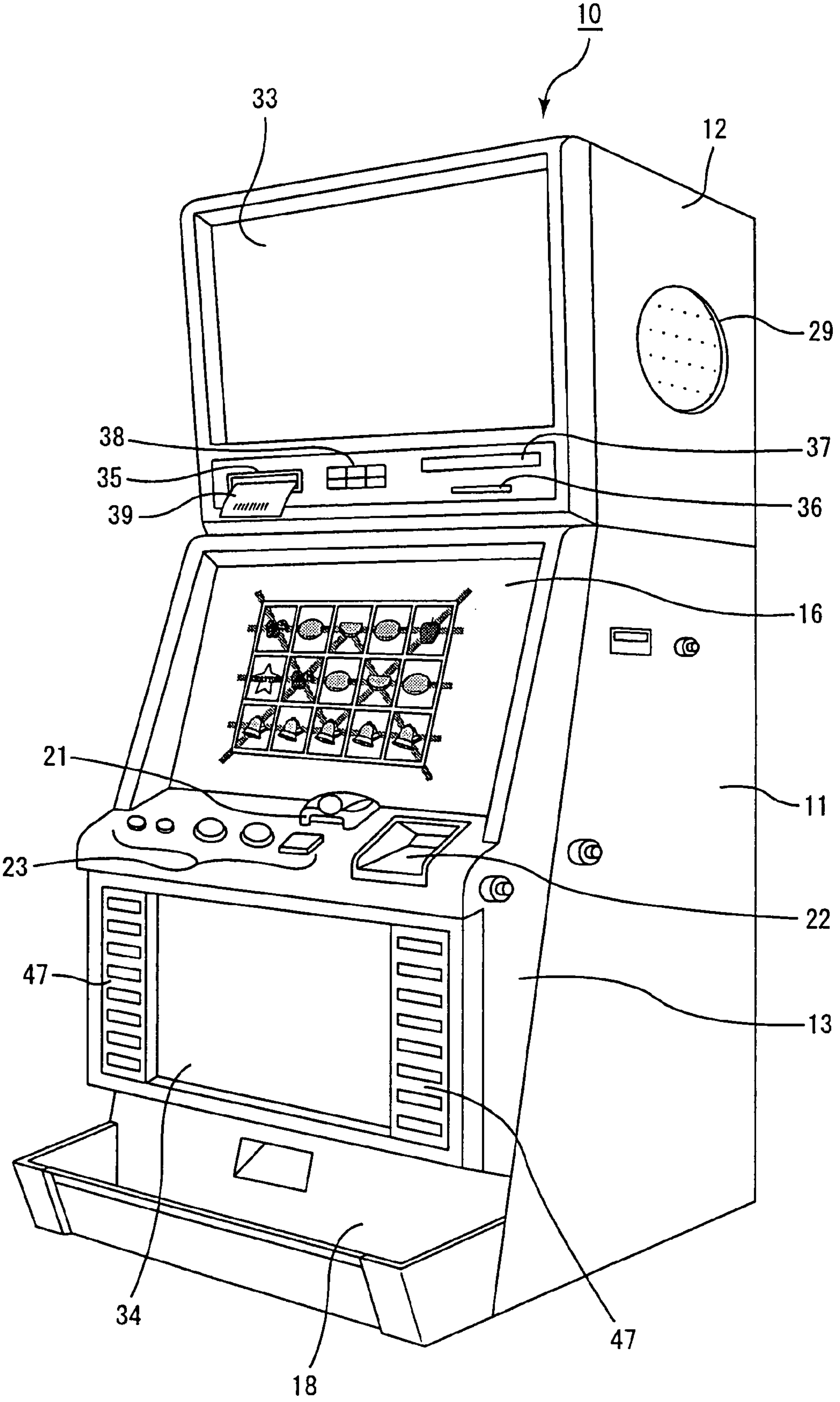
FIG. 3 is a perspective view schematically illustrating a slot machine (a gaming terminal) according to an embodiment of the present invention.

FIG. 3 is a perspective view schematically illustrating a slot machine according to an embodiment of the present invention.

The slot machine 10 includes a cabinet 11, a top box 12 installed at the upper portion of the cabinet 11 and a main door 13 provided in the front surface of the cabinet 11. A lower display 16 is provided in the front side of the main door 13. The lower display 16 includes a liquid crystal display panel which displays a symbol matrix constituted by a total of 15 symbols along 5 columns and 3 rows. The cabinet 11 corresponds to the cabinet according to the present invention. The lower display 16 corresponds to the front-side display according to the present invention.

Although not illustrated, a touch panel 69 is provided in the front surface of the lower display 16, and the player can operate the touch panel 69 to input various types of commands. Further, under the lower display 16, there are provided various types of input buttons 23 which enables the player to input various types of commands relating to the progress of games, a coin acceptor 21 which receives coins, and a bill validator 22 which determines whether or not bills are valid and receives valid bills. Also, the bill validator 22 can be configured to be capable of reading a ticket 39 with a bar code. In the lower front surface of the main door 13, a belly glass 34 on which characters and the like of the slot machine 10 are drawn is provided.

In the lower front surface of the main door 13, there is provided a foot display 34 which displays predetermined images based on image display control data included in game software being executed. Such images may be, for example, characters and the like of the slot machine 10.

At the both sides of the foot display 34, there are provided lamps 47 which emit light with a pattern corresponding to a light-emission pattern data included in the game software being executed. The foot display 34 corresponds to the foot display according to the present invention.

An upper display 33 is provided in the front surface of the top box 12. The upper display 33 includes a liquid crystal display panel which displays a payout table and the like. The upper display 33 corresponds to the upper display according to the present invention.

Further, a speaker 29 is provided in the top box 12. Under the upper display 33, a ticket printer 35, a card reader 36, a data display 37 and a key pad 38 are provided. The ticket printer 35 prints, on a ticket, a bar code as coded data of the number of credits, the time and date, the identification number of the slot machine 10 and the like, and outputs the ticket as a ticket 39 with a bar code. It is possible for the player to make another slot machine to read the ticket 39 with a bar code and play a game on the slot machine, or exchange the ticket 39 with a bar code for bills and the like at a predetermined place in a game facility (e.g. a cashier in a casino).

The card reader 36 enables a smart card to be inserted thereinto and reads and writes data from and into the inserted smart card. The smart card is a card owned by the player and stores, for example, data for identifying the player, data of the history of games played by the player (game history data). The smart card can store data corresponding to coins, bills or a credit. Also, instead of such a smart card, it is possible to employ a magnetic stripe card. The data display 37 is comprised of a fluorescent display or the like and displays, for example, data read by the card reader 36 and data inputted by the player through the key pad 38. Also, instead of a smart card, it is possible to employ an RFID system and employ a card which enables reading and writing data therefrom and thereinto in a non-contact manner. The key pad 38 enables inputting commands and data about issue of tickets and the like. The card reader 36 corresponds to the card slot according to the present invention. The smart card corresponds to the card according to the present invention.

Figure 4:
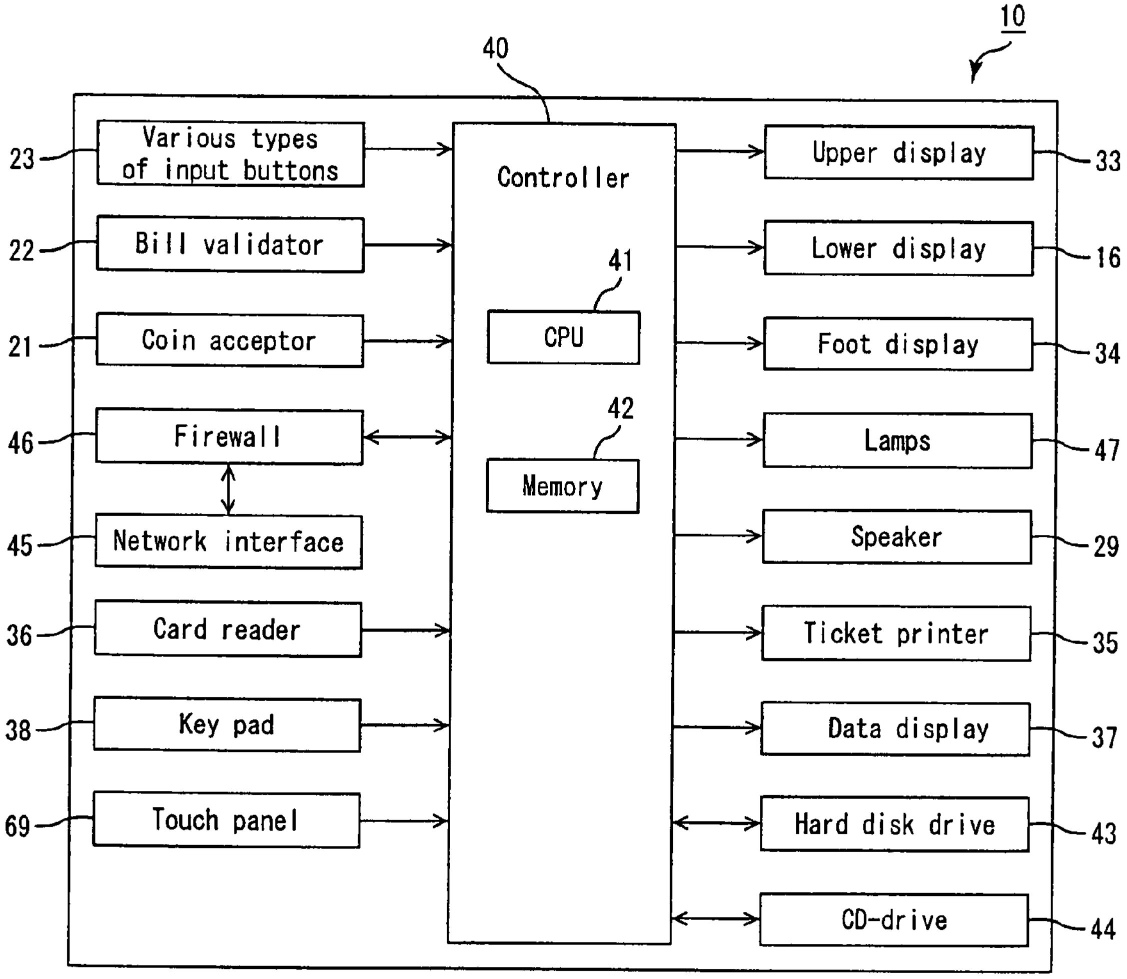
FIG. 4 is a block diagram illustrating the internal structure of the slot machine illustrated in FIG. 3.

FIG. 4 is a block diagram illustrating the internal structure of the slot machine illustrated in FIG. 3.

The slot machine 10 includes a controller 40 including a CPU 41 and a memory 42. The various types of input buttons 23, the bill validator 22 and the coin acceptor 21 are connected to the controller 40. Further, the network interface 45 is connected to the controller 40, through the firewall 46. Further, the card reader 36, the key pad 38 and the touch panel 69 are connected to the controller 40. The network interface 45 corresponds to the network interface according to the present invention.

Further, the upper display 33, the lower display 16, the foot display 34, the lamps 47, the speaker 29, the ticket printer 35, the data display 37, the hard disk drive 43 and the CD-drive 44 are connected to the controller 40. Game software components downloaded from the server 100 are stored in the hard disk drive 43 and the like. The controller 40 executes various types of programs included in game software components stored in the hard disk drive 43 and the like, for example, to conduct processing for displaying images to the upper display 33, the lower display 16 and the foot display 34, processing for outputting sounds from the speaker 29, processing for controlling the light emission from the lamps 47, and the like.

The hard disk drive 43 corresponds to the first memory according to the present invention. Further, the hard disk drive 43 corresponds to the second memory according to the present invention. While, in the present embodiment, there will be described a case where the first memory and the second memory are identical (they are the hard disk drive 43), the first memory and the second memory may be separated from each other in the present invention. The controller 40 corresponds to the controller according to the present invention.

Figure 5:
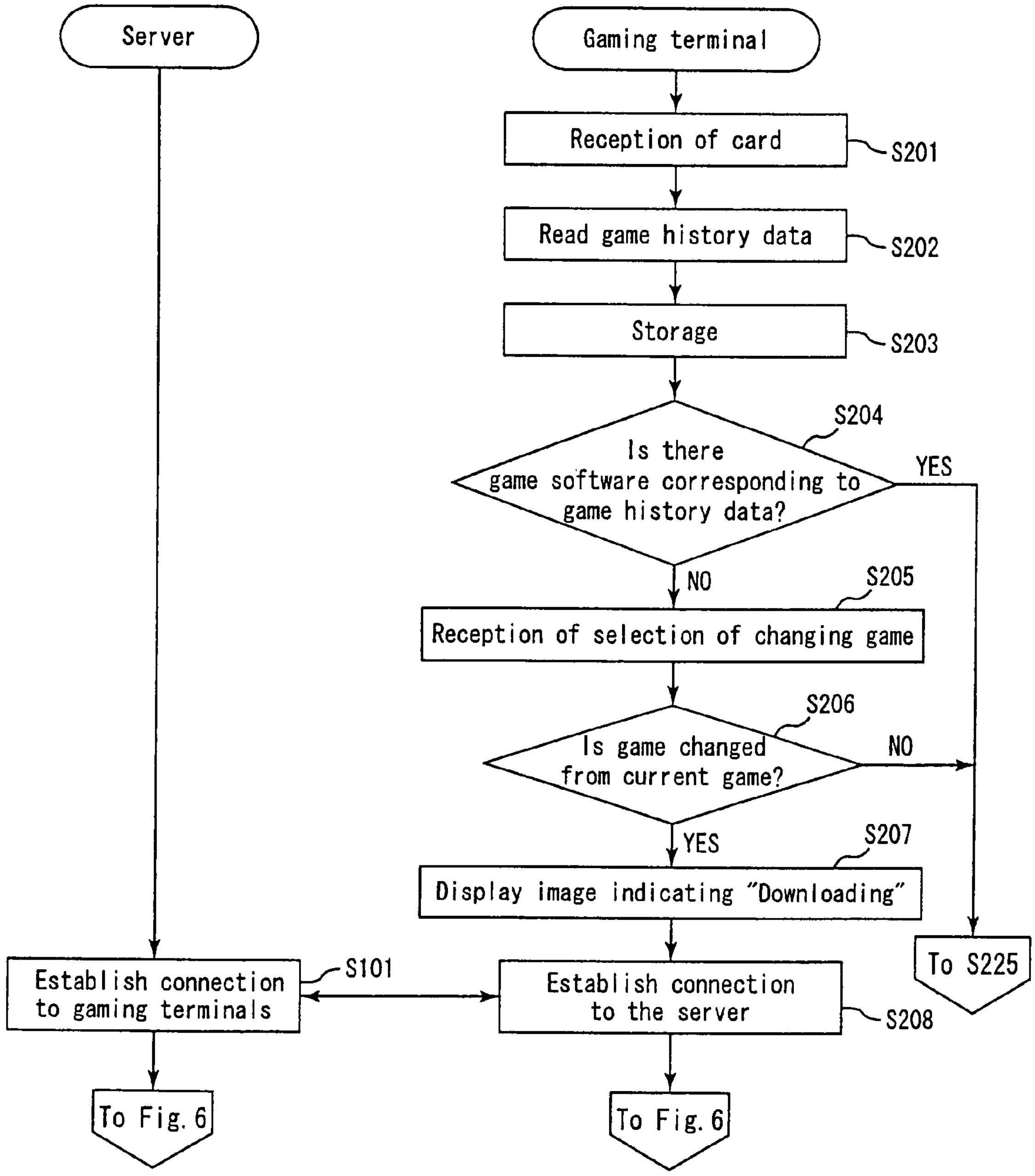
FIG. 5 is a flow chart illustrating processing which is conducted by a server and a slot machine according to an embodiment of the present invention.
Figure 6:
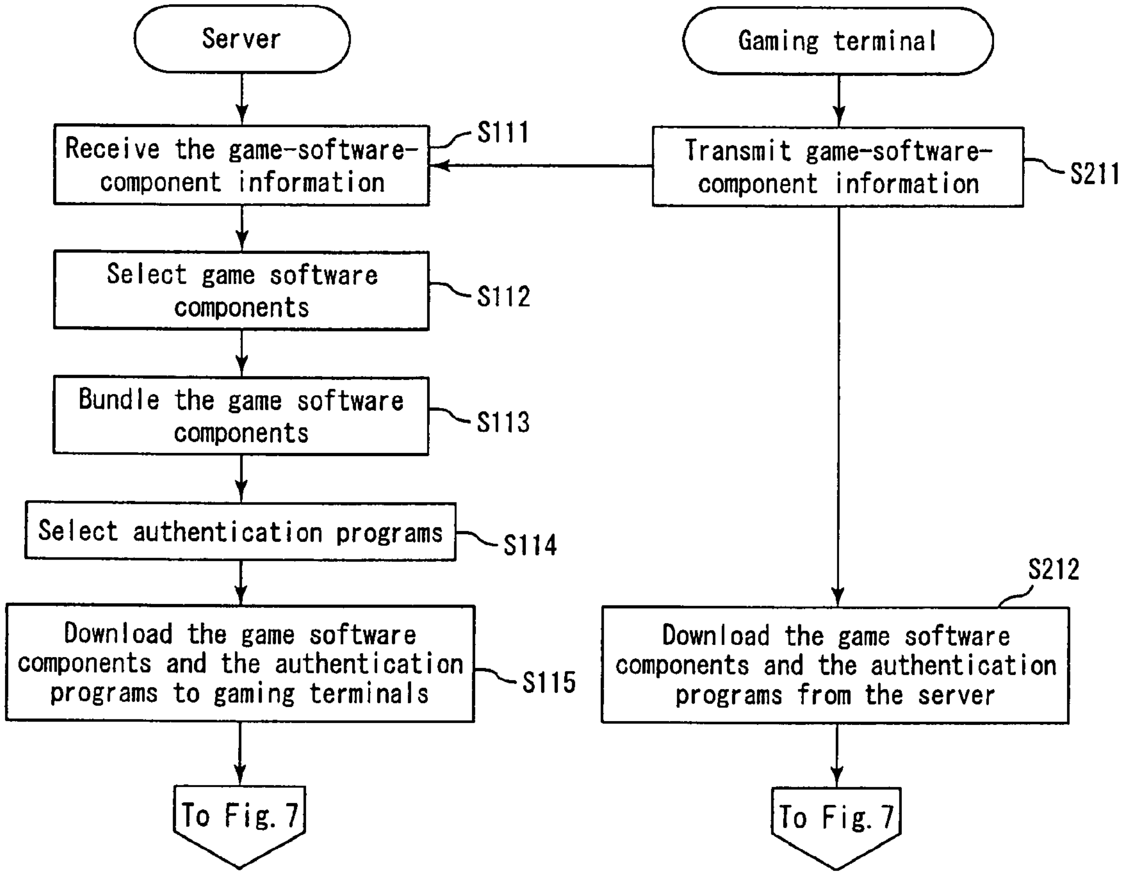
FIG. 6 is a flow chart illustrating processing which is conducted by a server and a slot machine according to an embodiment of the present invention.
Figure 7:
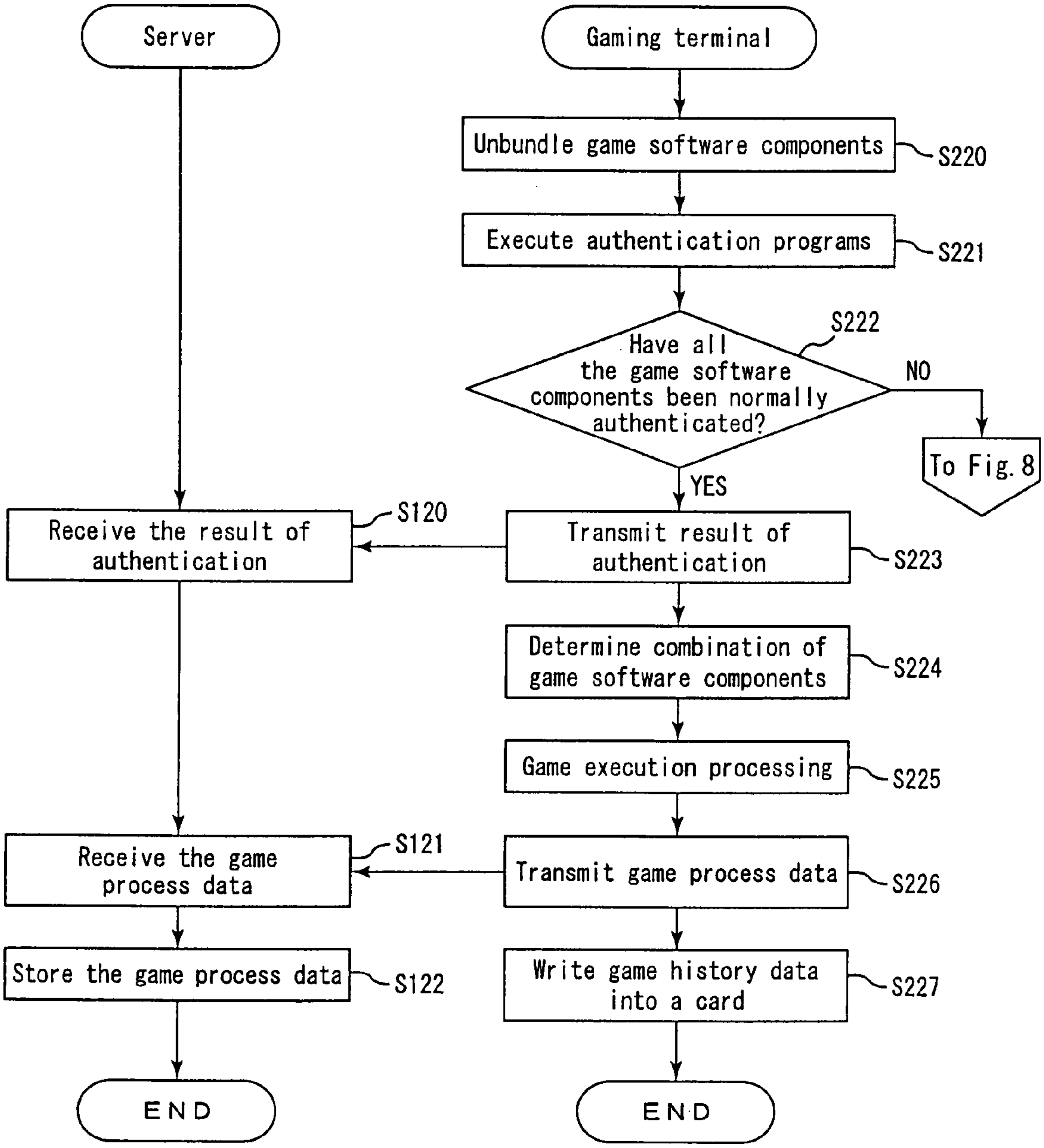
FIG. 7 is a flow chart illustrating processing which is conducted by a server and a slot machine according to an embodiment of the present invention.

FIGS. 5 to 7 are flow charts illustrating processing which is conducted by the server and a slot machine according to an embodiment of the present invention.

In the present embodiment, there will be described a case where a game A has been pre-stored, as the current game, in the hard disk drive 43.

First, the controller 40 in each slot machine 10 (a gaming terminal) receives insertion of a smart card (step S201).

Next, the controller 40 reads game history data from the smart card (step S202) and stores the game history data in the hard disk drive 43 (step S203). The game history data includes type-of-game information on games which have been played, points offered in the games which have been played in the past and the like. Such points are offered according to the number of consumed coins and the number of games, for example.

Next, the controller 40 determines whether or not game software (a combination of game software components) corresponding to the game history data is stored in the hard disk drive 43.

If the controller 40 determines that the game software corresponding to the game history data is not stored in the hard disk drive 43, the process is transferred to a step S205. On the other hand, if the controller 40 determines that the game software corresponding to the game history data is stored in the hard disk drive 43, the process is transferred to a step S225. For example, in a case where the type-of-game information included in the game history data is the game A, if game software relating to the game A is not stored in the hard disk drive 43, then the process is transferred to the step S205. On the other hand, if the software is stored therein, the process is transferred to the step S225.

At the step S205, the controller 40 receives a game changing selection. In this processing, the controller 40 displays an image indicating games which have been played in the past (the games indicated by the type-of-game information) to the lower display 16, and receives an input of selection for determining whether or not to change from the current game.

Figure 9:
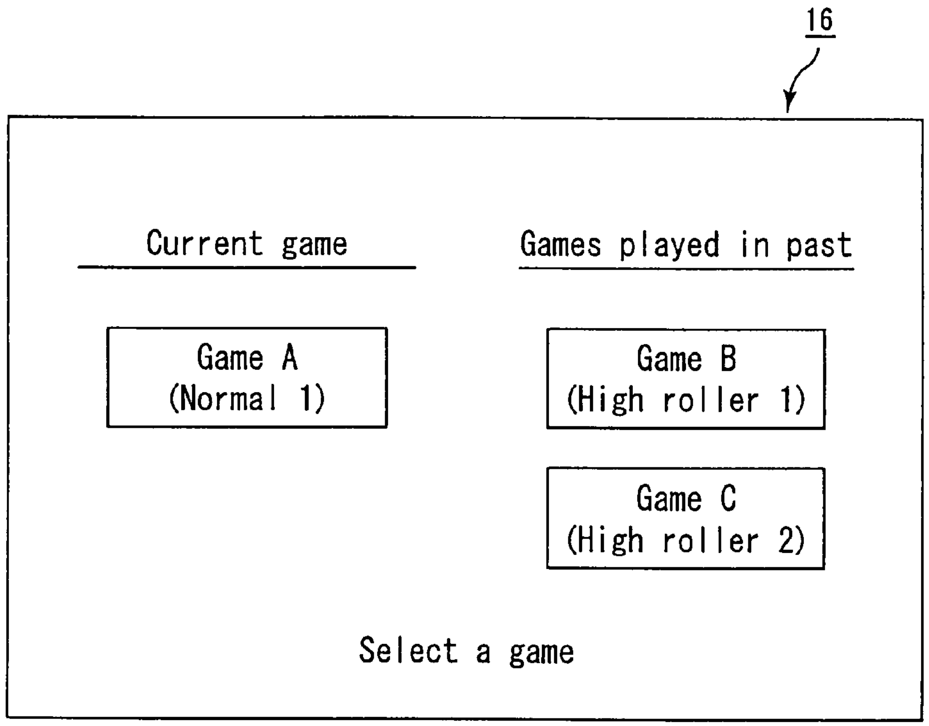
FIG. 9 is a view illustrating an image displayed to a lower display in the slot machine.

FIG. 9 is a view illustrating an image which is displayed to the lower display in the slot machine.

As illustrated in FIG. 9, the game A (Normal 1) is displayed as the current game at a left portion of the lower display 16. This image indicates that the game currently possible to be played in the slot machine 10 is the game A (Normal 1).

Further, at a right portion of the lower display 16, a game B (High roller 1) and a game C (High roller 2) are displayed as games which have been played in the past. This image indicates that the game can be changed to the game B (High roller 1) or the game C (High roller 2).

Further, at a lower portion of the lower display 16, there is displayed a massage describing "Select a game". At the step S205, the player can input whether or not he or she desires to change the current game (the game A) to a game which has been played (the game. B or the game C), by touching the touch panel 69. The touch panel 69 corresponds to the selection switch according to the present invention. However, in the present invention, the selection switch is not limited to the case, but may be, for example, the various types of input buttons 23 or the key pad 38 or may be separately provided.

If there is an input of selection of changing from the current game, an image indicating that game software is being downloaded (see FIG. 10) is displayed to the lower display 16 (step S207), and the process is transferred to a step S208. On the other hand, if there is an input of selection of not changing from the current game, namely if there is an input of selection of executing the current game, the process is transferred to the step S225.

Figure 10:
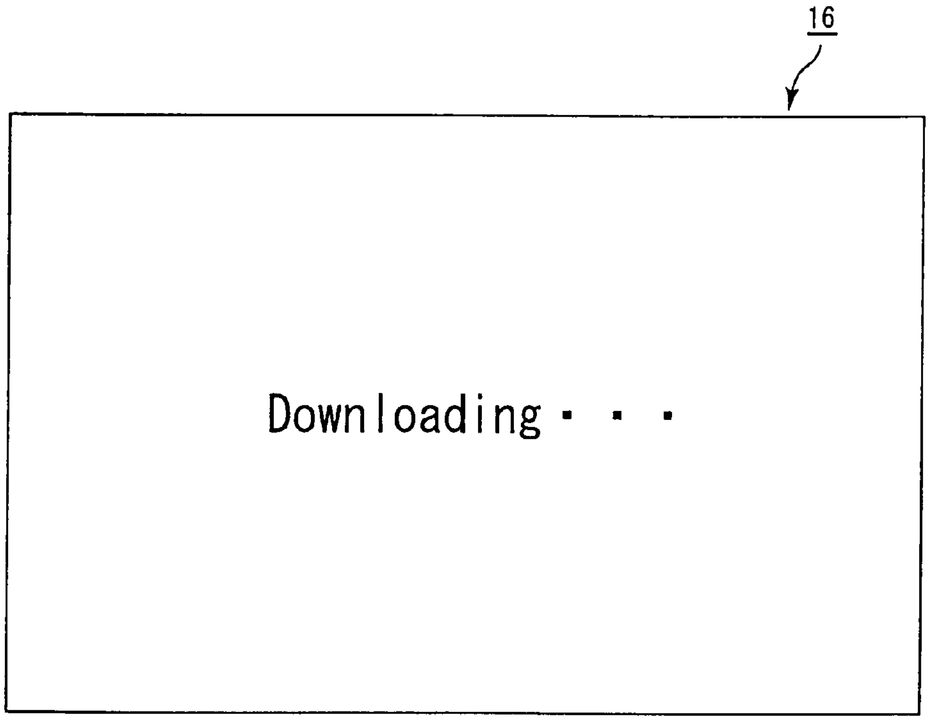
FIG. 10 is a view illustrating an image displayed to a lower display in the slot machine.

FIG. 10 is a view illustrating an image which is displayed to the lower display in the slot machine.

As illustrated in FIG. 10, there is displayed, to the lower display 16, an image describing "Downloading".

At a step S208, the controller 40 conducts processing for establishing connection to the server 100. At this time, the processor 101 in the server 100 conducts processing for establishing connection to the slot machine 10 (step S101).

Next, at a step S211, the controller 40 transmits game-software-component information to the server 100. The aforementioned game-software-component information includes, for example, type-of-game information included in the game history data read from the smart card, the list of game software components stored in the hard disk drive 43 and the like, and version information on the game software components. The game-software-component information corresponds to the request signal according to the present invention.

On receiving the game-software-component information from each slot machine 10, the processor 101 stores it in the database 106 (step S111). Next, the processor 101 selects game software components to be downloaded (step S112).

Next, the processor 101 reads the selected game software components from the database 106 and bundles them in such a way that they can be downloaded to the slot machine 10 (step S113) The processing at the step S113 includes, for example, processing for coding the game software components, processing for compressing the game software components, processing for dividing the game software components into a plurality of packets, and the like.

Next, the processor 101 selects authentication programs which correspond to the game software components selected at the step S113 (step S114). At the step S114, the processor 101 further bundles the selected authentication programs. Also, the processing at the step S114 can be conducted along with the step S113. Namely, the selected game software components and the selected authentication programs can be bundled, after the selection of the authentication programs.

Next, the processor 101 downloads the game software components and the authentication programs to the slot machine 10 (step S115). At this time, each controller 40 downloads the game software components and the authentication programs from the server 100 and stores them in the hard disk drive 43 (step S212).

The controller 40 unbundles the downloaded game software components (step S220). The processing at the step 220 includes, for example, processing for decoding the game software components, processing for decompressing the game software components, combining packets, virus checks, and the like. At the step S220, the controller 40 further unbundles the authentication programs.

Next, the controller 40 executes the authentication programs (step S221). At the step S221, the controller 40 executes a hash function for the respective game software components to create hash values and compares them with hash values pre-stored in the authentication programs. Thus, the controller 40 determines whether or not there are falsifications. If there is no falsification, this results in normal authentication. If there is a falsification, this results in the occurrence of an error.

Next, the controller 40 determines whether or not all the game software components have been normally authenticated (step S222). If the controller determines that not all the game software components have been normally authenticated (if an error occurs), processing which will be described in detail later with reference to FIG. 8 will be conducted.

If the controller 40 determines, at the step S222, that all the game software components have been normally authenticated, the controller 40 transmits the result of the authentication to the server 100 (step S223). The result of the authentication includes the list of the game software components which have been normally authenticated, version information about the aforementioned game software components, the ID code of the gaming terminal (the slot machine 10), and the like. At this time, the processor 101 receives the result of the authentication (step S120).

The controller 40 determines a new combination of game software components, using the downloaded game software components, after the processing at the step S223 (step S224). At this time, the new combination of game software components can be determined, using only the downloaded game software components. Also, the new combination of game software components can be determined, using both the existing game software components and the downloaded game software components.

Next, the controller 40 conducts game execution processing, using the combination of game software components determined at the step S224 (step S225). In the present embodiment, the game execution processing is processing for executing games to be played in the slot machine. In the present invention, the game execution processing is processing corresponding to games to be played in the gaming terminal.

Next, the controller 40 transmits game process data to the server 100 (step S226). On the other hand, the processor 101 receives the game process data from the slot machine 10 (step S121). The game processing data includes the number of consumed coins and the number of games, and points offered in games. These data is stored as game history data, in association with the ID code. Thereafter, the processor 101 stores the game process data in the database 106 (step S122) and ends the present processing. On the other hand, after the processing at the step S226, the controller 40 writes the game history data into the smart card (step S227) and ends the present processing.

Figure 8:
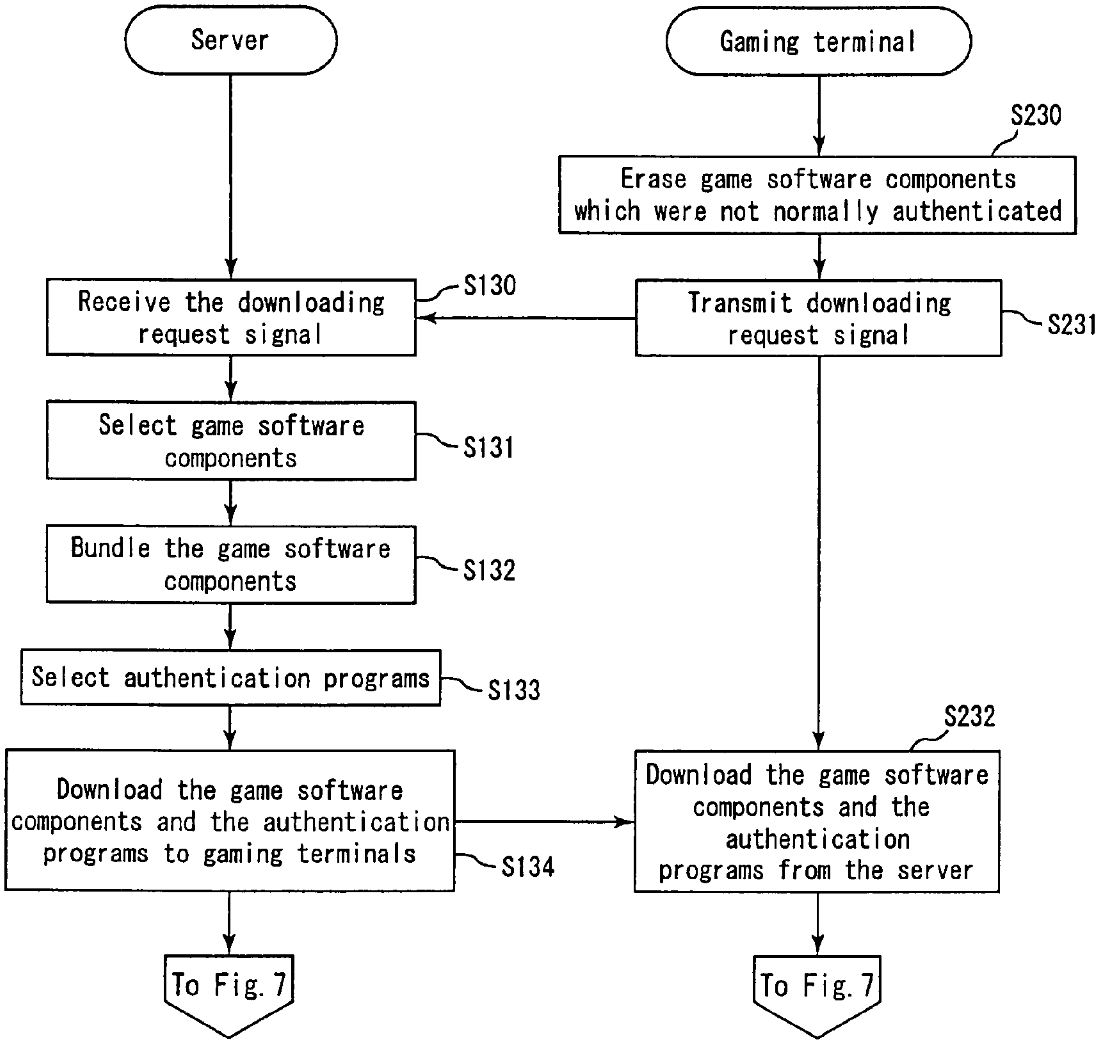
FIG. 8 is a flow chart illustrating processing which is conducted by a server and a slot machine according to an embodiment of the present invention.

Next, with reference to FIG. 8, there will be described a case where it is determined at the step S222 in FIG. 7 that not all the game software components have been normally authenticated.

First, the controller 40 erases the game software components which were not normally authenticated, from the hard disk drive 43 and the like (step S230). Next, the controller 40 transmits a downloading request signal to the server 100 (step S231). The aforementioned request signal includes data which specifies the erased game software components. At this time, the processor 101 receives the aforementioned request signal from the slot machine 10 (step S130).

Thereafter, the processor 101 selects the game software components specified by the data included in the aforementioned request signal (step S131), then bundles the game software components (step S132) and selects authentication programs corresponding to the game software components (step S133). Then, the processor 101 downloads the game software components and the authentication programs to the slot machine 10 (step S134). On the other hand, the controller 40 downloads the game software components and the authentication programs from the server 100 (step S232).

The processing at the steps S131 to S134 and S203 is processing similar to the processing at the steps S112 to S115 and S212 which have been already described and, therefore, description thereof is omitted herein. After the processing at the steps S134 and S232, the processing illustrated in FIG. 6 is conducted.

As described above, the gaming system 1 according to the present embodiment includes the slot machine 10 (a gaming terminal) and the server 100 (see FIG. 1).

The slot machine 10 includes the hard disk drive 43 (the first memory and the second memory), a network interface 45 and the controller 40 (see FIG. 4). The hard disk drive 43 stores the aforementioned game history data acquired according to inputs from outside. Further, the hard disk drive 43 stores game software received through the network interface 45. The controller 40 transmits game-software-component information to the server 100, when the game software corresponding to the game history data stored in the hard disk drive 43 is different from the game software which has been already stored in the hard disk drive 43 (step S211 in FIG. 6). Further, the controller 40 stores, in the hard disk drive 43, game software which was transmitted from the server 100 in response to the game-software-component information (step S212 in FIG. 6). Then, the controller 40 executes games based on the game software stored in the hard disk drive 43 (step S225 in FIG. 7). At this time, the controller 40 controls the displays within the lower display 16 (the front side display), the upper display 33 and the foot display 34 and also controls the light-emission pattern of the lamps 47.

The server 100 includes the database 106 (the third memory) and the processor 101.

The database 106 stores a plurality of types of game software. If the processor 101 receives game-software-component information from the slot machine 10, the processor 101 selects game software corresponding to the received game-software-component information from the database 106 and transmits the game software to the slot machine 10 (step S115 in FIG. 6).

Figure 11:
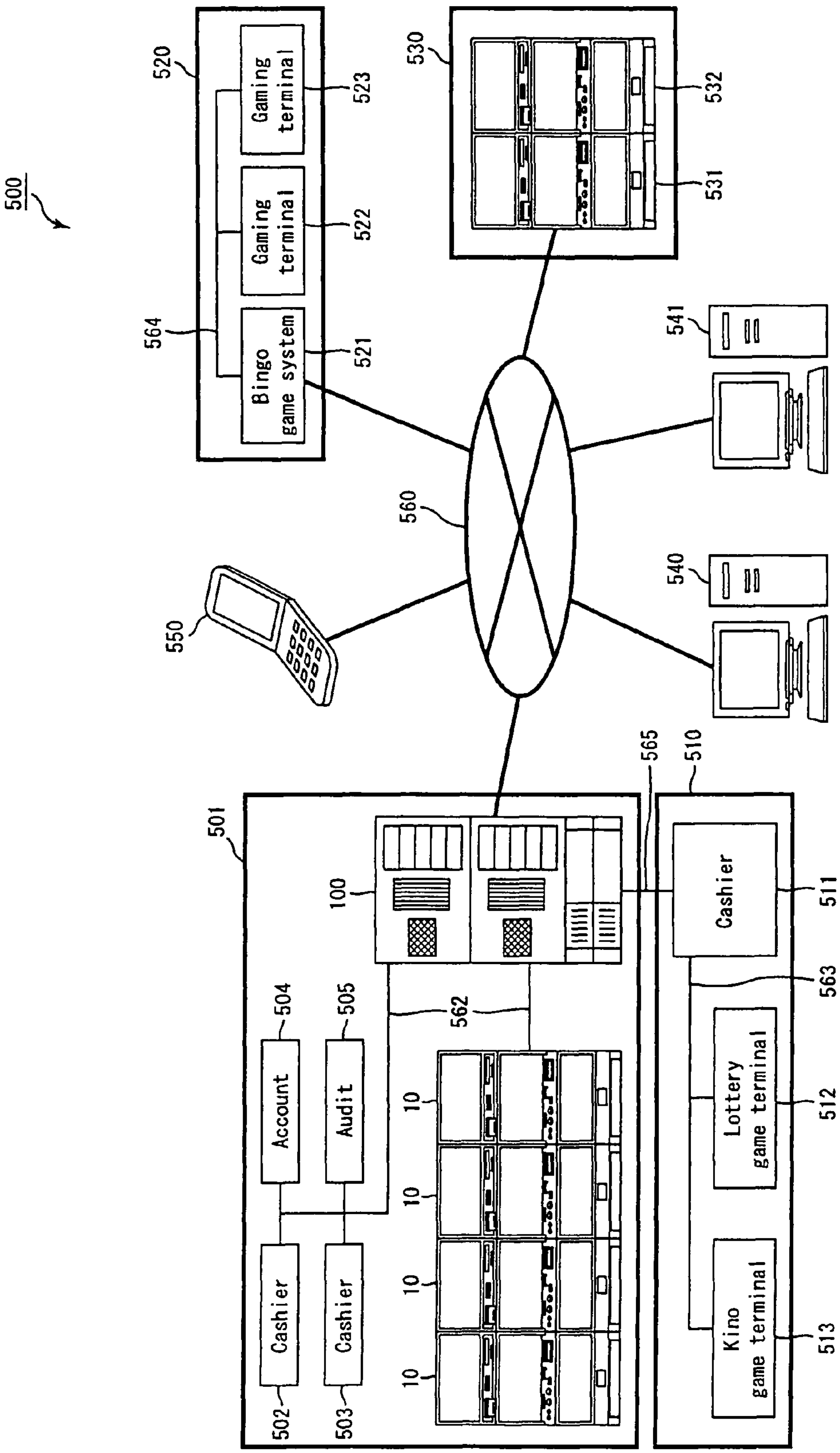
FIG. 11 is a network schematic diagram of a gaming system according to another embodiment of the present invention.

FIG. 11 is a network schematic diagram of a gaming system according to another embodiment of the present invention.

The gaming system 500 includes a server 100. Further, the gaming system 500 includes, as gaming terminals, slot machines 10, a lottery game terminal 512, a Kino game terminal 513, a bingo game system 521, gaming systems 522 and 523, video poker game machines 531 and 532, personal computers 540 and 541 and a portable phone 550.

The server 100 is installed in a casino 501. The plurality of slot machines 10, cashiers 502 and 503, an account 504 and an audit 505 are connected to the server 100 through a LAN 562.

Further, the server 100 is connected to a cashier 511 installed in a restaurant 510, through a secure private intranet 565. Further, the cashier 511 is connected to the lottery game terminal 512 and the Kino game terminal 513, through the LAN 563.

As described above, in the present invention, the server and the gaming terminals can be connected to each other through an intranet. Further, another device (a cashier 511) may be interposed between the server and the gaming terminals.

Further, the server 100 is connected to the bingo game system 521 installed in another casino 520, through the internet 560. The bingo game system 521 is connected to gaming terminals 522 and 523 for executing bingo games, through a LAN 564. Further, the server 100 is connected to the plurality of video poker game machines 531 and 532 installed in a commercial facility 530, through the internet 560. Further, the server 100 is connected to the personal computers 540 and 541 and the portable phone 550, through the internet 560. As described above, in the present invention, the server and the gaming terminals can be connected to each other through the internet. Also, the gaming terminals may be personally-owned devices, such as the personal computers 540, 541 and the portable phone 550.

Although the present invention has been described with reference to embodiments thereof, these embodiments merely illustrate concrete examples, not restrict the present invention. The concrete structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there have been described processes to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming terminal comprising:

a card slot into which a card storing identification data for identifying a player is inserted;

a first memory capable of storing game history data for the player, the game history data being read from the card inserted into the card slot;

a network interface for communicating with a server which stores a plurality of types of game software;

a second memory which stores game software downloaded from said server through said network interface;

a selection switch that receives instructions entered by a player;

a display capable of displaying an image; and a controller, said controller acquiring game history data of the player corresponding to the identification data, the game history data including game type information regarding a game that the player has played, and storing said game history data in the first memory, when the game history data is stored, determining whether a type of game software corresponding to the game history data stored in the first memory is identical with a type of game software stored in the second memory, displaying on the display, an image that enables selection of whether to change a type of game software stored in the second memory to one of one or more types of game software corresponding to the game history data stored in the first memory, when the type of game software corresponding to the game history data stored in the first memory is determined to be different from the type of game software stored in the second memory, downloading selected type of game software from said server through said network interface, when, based on an input from the selection switch, the type of game software stored in the second memory is to be changed to any one of one or more types of game software corresponding to the game history data stored in the first memory, storing the downloaded game software in said second memory, and executing a game based on the game software downloaded and stored in said second memory.

2. A gaming terminal comprising:

a cabinet;

a front-side display provided in a front surface of said cabinet;

an upper display provided above said front-side display;

a foot display provided below said front-side display;

lamps which emit light with a predetermined pattern;

a card slot into which a card storing identification data for identifying a player is inserted;

a first memory capable of storing game history data for the player, the game history data being read from the card inserted into the card slot;

a network interface communicating with a server which stores a plurality of types of game software;

a second memory which stores a game software from said server through said network interface;

a selection switch receiving instructions entered by a player; and a controller, said controller acquiring game history data of the player corresponding to the identification data, the game history data including game type information regarding a game that the player has played, and storing said game history data in the first memory, when the game history data is stored, determining whether a type of game software corresponding to the game history data stored in the first memory is identical with a type of game software stored in the second memory, displaying on the front-side display an image enabling selection of whether to change a type of game software stored in the second memory to one or more types of game software corresponding to the game history data stored in the first memory, when the type of game software corresponding to the game history data stored in the first memory is determined to be different from the type of game software stored in the second memory, downloading selected type of game software from said server through said network interface, when, based on an input from the selection switch, the type of game software stored in the second memory is to be changed to any one of one or more types of game software corresponding to the game history data stored in the first memory, storing the downloaded game software in said second memory, and controlling said front-side display, said upper display and said foot display and also controlling light-emission pattern of said lamps, based on the game software downloaded and stored in said second memory.

3. A game control method for a gaming terminal comprising:

acquiring game history data of a player corresponding to an identification data of the player which is stored in a card inserted into a card slot of the gaming terminal, the game history data including game type information regarding a game that the player has played, and storing said game history data in a first memory;

when the game history data is stored, determining whether a type of game software corresponding to the game history data stored in the first memory is identical with a type of game software stored in a second memory;

displaying on a display an image enabling selection of whether to change a type of game software stored in the second memory of the gaming terminal to one or more types of game software corresponding to the game history data stored in the first memory, when the type of game software corresponding to the game history data stored in the first memory is determined to be different from the type of game software stored in the second memory;

selecting a type of game software based on the image;

downloading selected type of game software from a server, when, based on an input from a selection switch operable by the player, the type of game software stored in the second memory is to be changed to any one of one or more types of game software corresponding to the game history data stored in the first memory;

storing the downloaded game software in said second memory; and executing a game based on the game software downloaded and stored in said second memory.

4. A game control method for a gaming terminal comprising the steps of:

acquiring game history data of a player corresponding to an identification data of the player which is stored in a card inserted into a card slot of the gaming terminal, the game history data including game type information regarding a game that the player has played, and storing said game history data in a first memory;

when the game history data is stored, determining whether a type of game software corresponding to the game history data stored in the first memory is identical with a type of game software stored in a second memory;

displaying on a front-side display provided in a front surface of a cabinet an image enabling selection of whether to change a type of game software stored in the second memory of the gaming terminal to one or more types of game software corresponding to the game history data stored in the first memory, when the type of game software corresponding to the game history data stored in the first memory is determined to be different from the type of game software stored in the second memory;

selecting a type of game software based on the image using a selection switch operable by the player;

downloading selected type of game software including a payout table corresponding to the game history data stored in said first memory from a server, when, based on an input from the selection switch, the type of game software stored in the second memory is to be changed to any one of one or more types of game software corresponding to the game history stored in the first memory;

downloading selected type of game software components, when, based on an input from the selection switch, the type of game software stored in the second memory is to be changed to any one of one or more types of game software corresponding to the game history stored in the first memory;

storing the downloaded game software in said second memory; and controlling the front-side display, an upper display provided above said front-side display and a foot display provided below said front-side display and also controlling light-emission pattern of lamps provided in said cabinet, based on the downloaded game software stored in said second memory.

5. The gaming terminal of claim 1, wherein the game history data further includes game data for each of games that have been played by the player, the controller displays on the display the games that have been played by the player in order of the game data, and the game data for each game includes any one of a number of played games, a number of games in which coins are paid out, or a number of coins paid out.

6. The gaming terminal of claim 2, wherein the game history data further includes game data for each of games that have been played by the player, the controller displays on the front-side display the games that have been played by the player in order of the game data, and the game data for each game includes any one of a number of played games, a number of games in which coins are paid out, or a number of coins paid out.

7. The game control method of claim 3, wherein the game history data further includes game data for each of games that have been played by the player, displaying the image includes displaying on the display the games that have been played by the player in order of the game data, and the game data for each game includes any one of a number of played games, a number of games in which coins are paid out, or a number of coins paid out.

8. The game control method of claim 4, wherein the game history data further includes game data for each of games that have been played by the player, displaying the image includes displaying on the front-side display the games that have been played by the player in order of the game data, and the game data for each game includes any one of a number of played games, a number of games in which coins are paid out, or a number of coins paid out.

9. A gaming terminal comprising:

a card slot into which a card storing identification data for identifying a player is inserted;

a first memory which stores game history data read from the card inserted in said card slot;

a network interface for communicating with a server which stores a plurality of types of game software;

a second memory which stores game software, downloaded from said server through said network interface;

a selection switch receiving instructions entered by a player, the selection switch for selecting game software;

a display capable of displaying an image; and a controller, said controller acquiring game history data of the player corresponding to the identification data, the game history data including game type information regarding a game that the player has played, and storing said game history data in the first memory, when the game history data is stored, determining whether a type of game software corresponding to the game history data stored in the first memory is identical with a type of game software stored in the second memory, displaying, to said display, an image which enables selection between game software stored in said second memory and game software corresponding to the game history data stored in said first memory, when the game software corresponding to the game history data stored in said first memory is determined to be different from the game software stored in said second memory, downloading selected type of game software from said server through said network interface, when, based on an input from the selection switch, when the type of game software stored in the second memory is to be changed to any one of one or more types of game software corresponding to the game history data stored in the first memory, storing the downloaded game software in said second memory, and executing a game based on the game software downloaded and stored in said second memory.

10. A gaming system comprising:

a gaming terminal; and a server, said gaming terminal comprising a card slot into which a card storing identification data for identifying a player is inserted;

a first memory capable of storing game history data for the player, the game history data being read from the card inserted into the card slot;

a network interface for communication;

a second memory which stores game software received through said network interface;

a selection switch which receives instructions entered by the player;

a display capable of displaying an image;

a controller, said controller acquiring game history data of the player corresponding to the identification data, the game history data including game type information regarding a game that the player has played, and storing said game history data in the first memory, when the game history data is stored, determining whether a type of game software corresponding to the game history data stored in the first memory is identical with a type of game software stored in the second memory, displaying on the display an image enabling selection of whether to change a type of game software stored in the second memory to one or more types of game software corresponding to the game history data stored in the first memory, when the type of game software corresponding to the game history data stored in the first memory is determined to be different from the type of game software stored in the second memory, transmitting a request signal which requests transmission of selected type of game software from said server, when, based on an input from the selection switch, the type of game software stored in the second memory is to be changed to any one of the one or more types of game software corresponding to the game history data stored in the first memory, storing, in said second memory, the game software transmitted in response to said request signal and executing games based on the game software, and said server comprising a third memory which stores a plurality of types of game software components; and a processor which, on receiving said request signal from said gaming terminal, selects game software from said third memory and transmits the game software components to said gaming terminal.

11. A game control method for a gaming terminal comprising the steps of:

acquiring game history data of a player corresponding to an identification data of the player which is stored in a card inserted into a card slot of the gaming terminal, the game history data including game type information regarding a a number of games that the player has played and data on points offered in the games that have been played according to a number of consumed credits and the number of games, and storing said game history data in a first memory;

when the game history data is stored, determining whether a type of game software corresponding to the game history data stored in the first memory is identical with a type of game software stored in a second memory;

displaying at a display an image enabling selection of whether to change a type of game software stored in the second memory of the gaming terminal to one or more types of game software corresponding to the game history data stored in the first memory, when the type of game software corresponding to the game history data stored in the first memory is determined to be different from the type of game software stored in the second memory;

selecting a type of game software based on the image using a selection switch operable by the player;

downloading selected type of game software including a payout table corresponding to the game history data stored in said first memory from said server, when, based on an input from the selection switch, the type of game software stored in the second memory is to be changed to any one of one or more types of game software corresponding to the game history stored in the first memory;

storing the downloaded game software in said second memory; and executing a game based on the game software downloaded and stored in said second memory.

12. A game control method comprising the steps of:

acquiring game history data of a player corresponding to an identification data of the player which is stored in a card inserted into a card slot of a gaming terminal, the game history data including game type information regarding a game that the player has played, and storing said game history data in a first memory;

when the game history data is stored, determining whether a type of game software corresponding to the game history data stored in the first memory is identical with a type of game software stored in a second memory;

downloading, to the second memory, game software selected by the player and corresponding to the game history data stored in said first memory, when the game software stored in said first memory is determined to be different from game software stored in the second memory, to said gaming terminal and storing in said second memory the downloaded game software; and executing a game based on the game software downloaded and stored in said second memory.

13. The gaming terminal of claim 9, wherein the game history data further includes game data for each of games that have been played by the player, the controller displays on the display the games that have been played by the player in order of the game data, and the game data for each game includes any one of a number of played games, a number of games in which coins are paid out, or a number of coins paid out.

14. The gaming system of claim 10, wherein the game history data further includes game data for each of games that have been played by the player, the controller displays on the display the games that have been played by the player in order of the game data, and the game data for each game includes any one of a number of played games, a number of games in which coins are paid out, or a number of coins paid out.

15. The game control method of claim 11, wherein the game history data further includes game data for each of games that have been played by the player, displaying the image includes displaying on the display the games that have been played by the player in order of the game data, and the game data for each game includes any one of a number of played games, a number of games in which coins are paid out, or a number of coins paid out.

16. The game control method of claim 12, wherein the game history data further includes game data for each of games that have been played by the player, the dame control method further includes displaying on the display the games that have been played by the player in order of the game data, and the game data for each game includes any one of a number of played games, a number of games in which coins are paid out, or a number of coins paid out.

* * * * *